(No Model.)

L. MONAHAN, Jr.
HOOF EXPANDER.

No. 383,585. Patented May 29, 1888.

WITNESSES:

INVENTOR:
L. Monahan Jr.
BY Munn & Co
ATTORNEYS.

UNITED STATES PATENT OFFICE.

LAWRENCE MONAHAN, JR., OF MORRIS PLAINS, NEW JERSEY.

HOOF-EXPANDER.

SPECIFICATION forming part of Letters Patent No. 383,585, dated May 29, 1888.

Application filed October 28, 1887. Serial No. 253,604. (No model.)

*To all whom it may concern:*

Be it known that I, LAWRENCE MONAHAN, Jr., of Morris Plains, in the county of Morris and State of New Jersey, have invented a new and useful Improvement in Hoof-Expanders, of which the following is a full, clear, and exact description.

My invention relates to an improvement in those contrivances called "hoof-expanders," adapted to be placed within the hoofs of horses or other animals, inside the shoes, to prevent the contraction of and to expand the hoofs, and consisting, generally, of a thin head adapted for reception between the toe and the shoe, and a pair of spring-legs fixed to said head, arranged to be seated on opposite sides of the frog, and having laterally-projecting prongs on their free ends constructed to be forced into the sides of the heel by the tension of the spring-legs. Heretofore it has been the custom to make these hoof-expanders in various sizes to fit different hoofs.

The object of my improvement is to provide a hoof-expander of this character, which can be readily adjusted to suit a hoof of any size; and to this end the invention consists, mainly, in interposing an adjustable joint between the spring-legs, whereby they may be spread and held at any angle with respect to each other, the whole constructed and arranged substantially as hereinafter described, and pointed out in the claims.

Reference is to be had to the accompanying drawings, forming a part of this specification, in which similar letters of reference indicate corresponding parts in both the figures.

Figure 1:
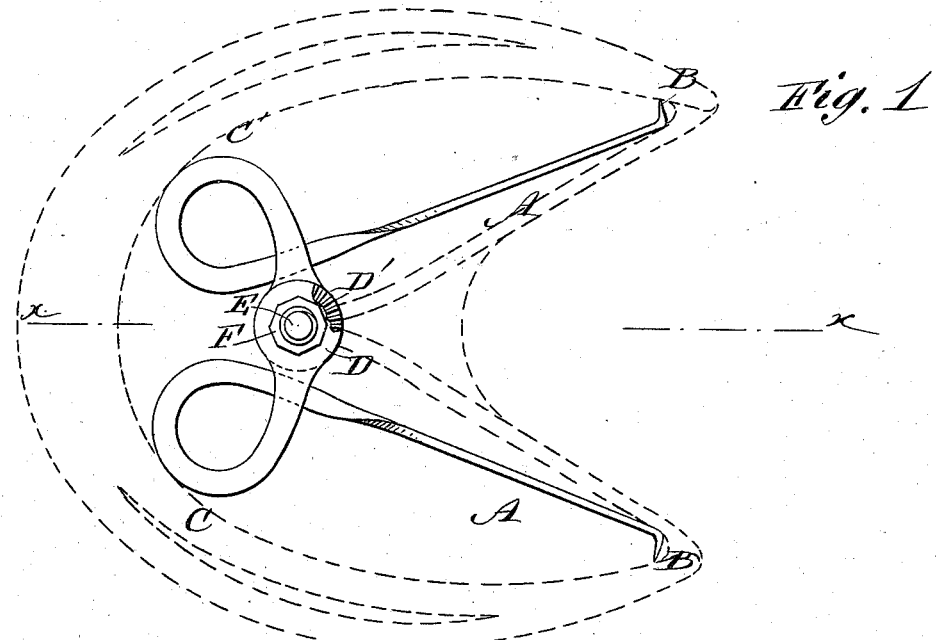
Figure 2:
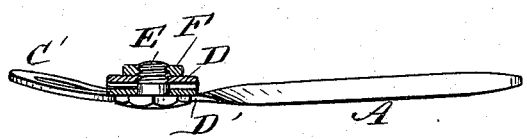

Figure 1 is a plan view of a hoof-expander embodying my improvement, part being broken out. Fig. 2 is a sectional elevation of the same on the line $x$ $x$, Fig. 1.

In the practice of my invention legs A are made of wrought metal or stiff wire with outwardly-projecting prongs B on their free ends, and preferably with curls C C' near their inner ends, forming stiff springs, in a well-known manner. The legs, with their respective spring-curls, form two separate sections, on the inner extremities of which are formed reverse toothed clutch disks D D', constructed to interlock with each other, and having central pivot-holes through which a headed pivot-bolt, E, is passed, having a clamp-nut, F, working on its threaded end.

The two-pronged legs B can be spread at any desired angle with each other when the clamp-nut F is loosened to fit the hoof to which the expander is to be applied, and when so adjusted the clamp-nut F is screwed up to lock the two clutch-disks together, and thus hold the pronged legs in position.

The expander is applied in the usual way before described, the curls C C' being introduced between the toe of the hoof and the shoe, and the legs sprung together to allow the prongs B to enter the sides of the heel.

Having thus described my invention, what I claim as new, and desire to secure by Letters Patent, is—

1. In a hoof-expander, the combination of spring-legs A, having prongs B, and interlocking disks D D', substantially as shown and described.

2. In a hoof-expander, the combination of spring-legs A, having prongs B, disks D D', having pivot-holes, a pivot-bolt, E, and a clamp-nut, F, substantially as shown and described.

LAWRENCE MONAHAN, JR.

Witnesses:
 JOHN B. VREELAND,
 JAS. J. BRENNAN.